4 Sheets--Sheet 4.
L. A. ROCKWELL.
Cracker-Machines.
No. 139,920.    Patented June 17, 1873.
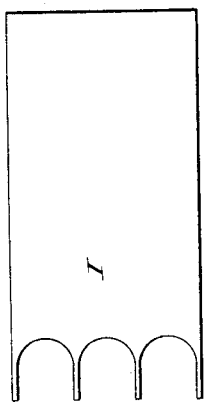
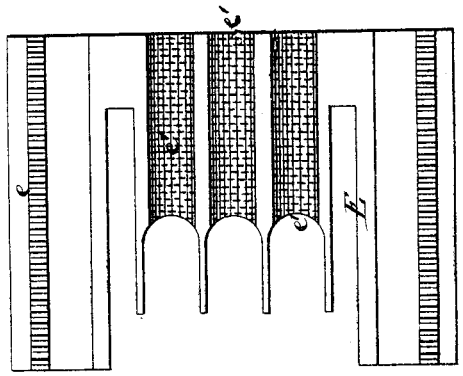
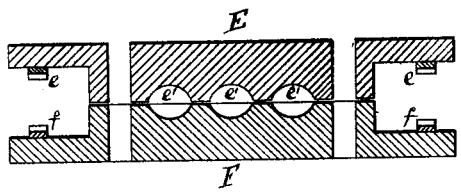
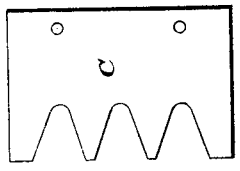
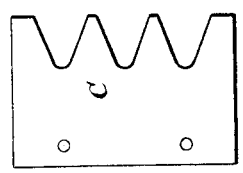
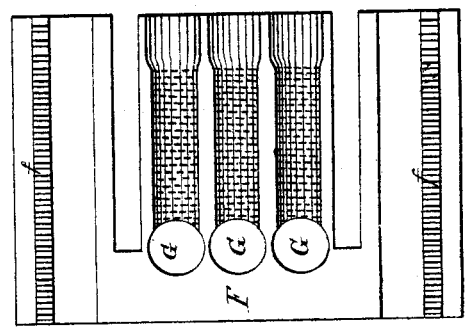

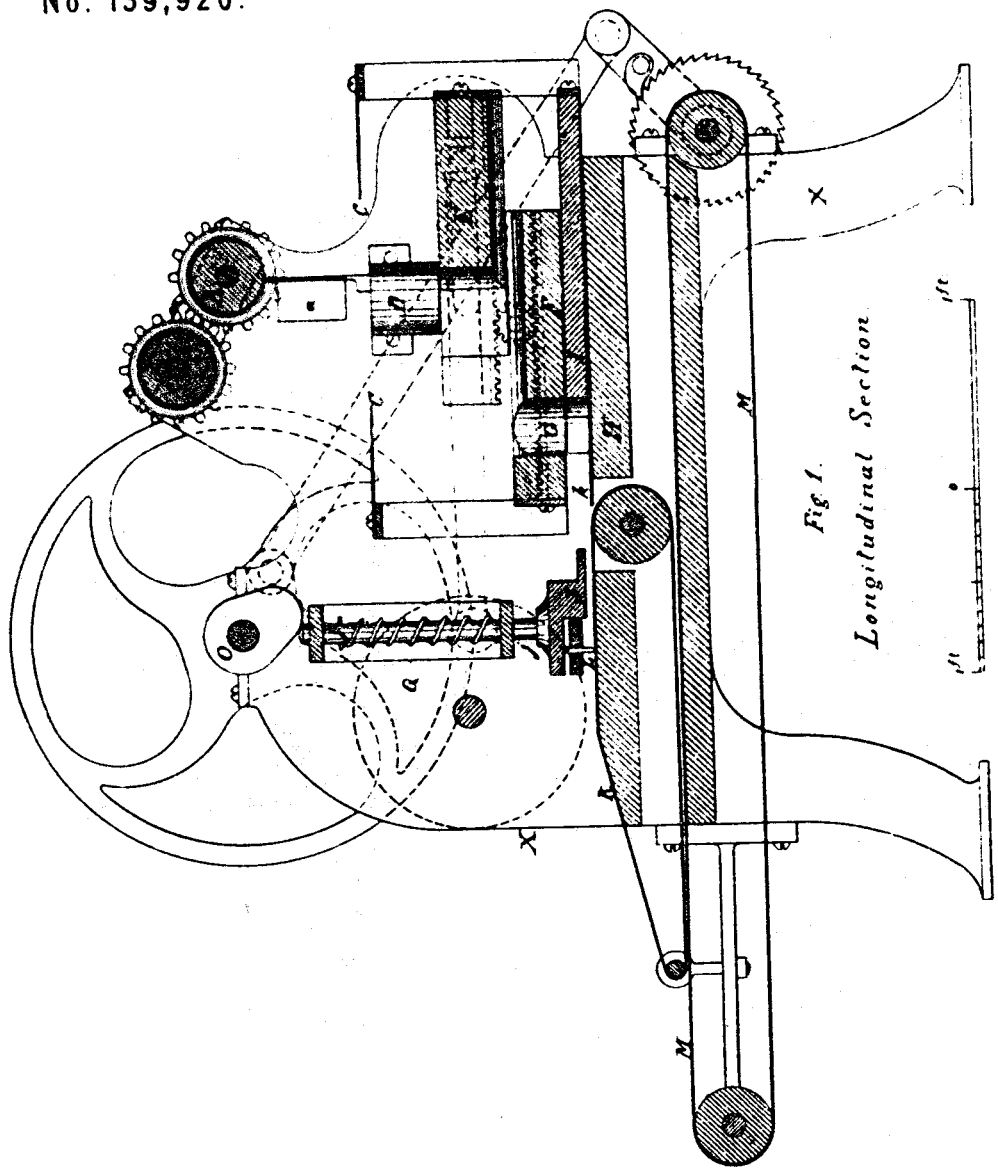
L. A. ROCKWELL.
Cracker-Machines.
No. 139,920.
4 Sheets- Sheet 1.
Patented June 17, 1873.
Fig. 1. Longitudinal Section
Witnesses,
Inventor

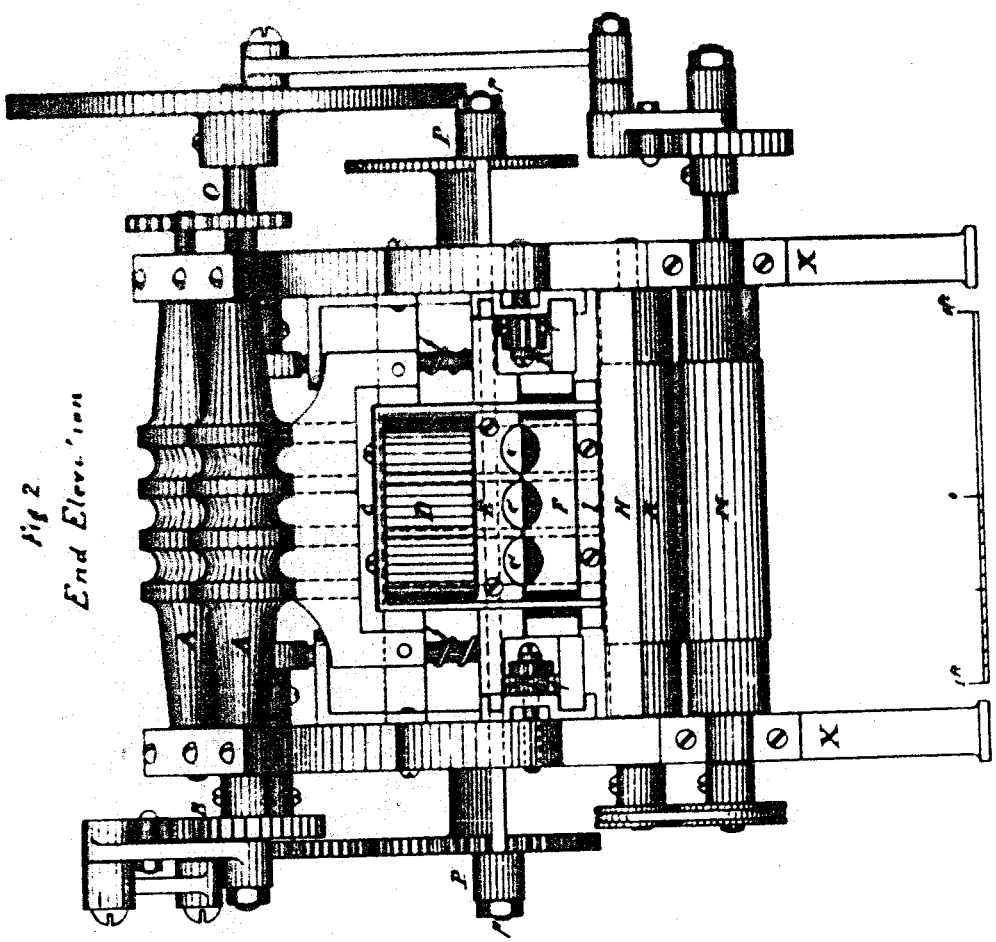

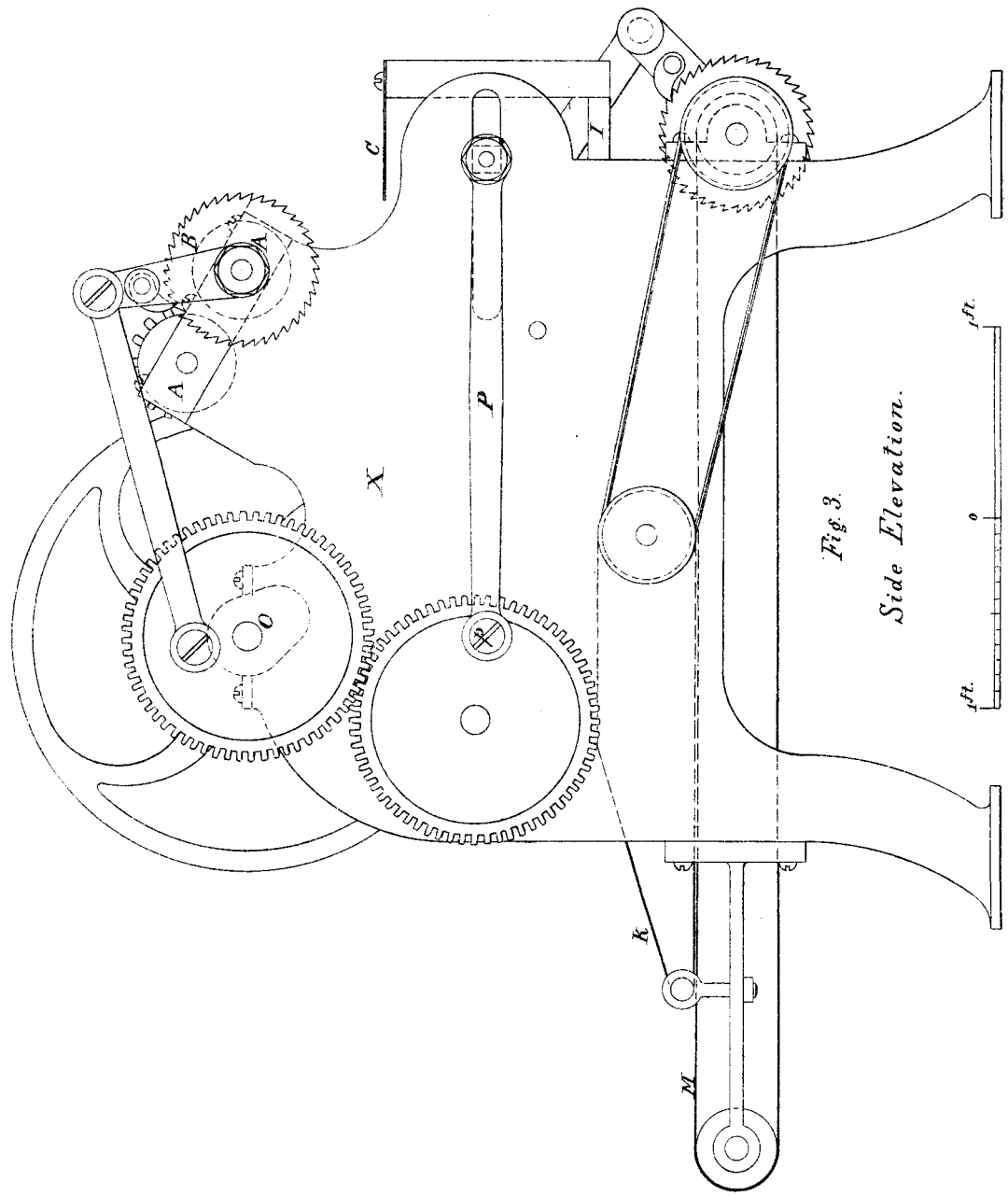

UNITED STATES PATENT OFFICE.

LUCIUS A. ROCKWELL, OF TREMONT, NEW YORK, ASSIGNOR TO HIMSELF AND JOHN A. CURRIER.

IMPROVEMENT IN CRACKER-MACHINES.

Specification forming part of Letters Patent No. 139,920, dated June 17, 1873; application filed May 19, 1873.

*To all whom it may concern:*

Be it known that I, LUCIUS A. ROCKWELL, of Tremont, Westchester county and State of New York, have invented certain Improvements Relating to Cracker-Machines, of which the following is a specification:

The object of my invention is to more conveniently and perfectly prepare skin-covered lumps of dough of equal size and in proper form. The importance of forming the dough with the smooth close covering known as skin has been long recognized, and the difference in the resulting cracker is highly appreciated in some localities.

My improved machine passes the dough through rollers properly formed to divide it into skin-surfaced ropes. It then cuts off the several ropes with peculiar knives acting in such a manner as to avoid flattening the ropes of dough. They cut off the nearly cylindrical masses or ropes in short lengths, approximating a cylindrical form, and of uniform size. These masses are guided down by peculiar means into a groove or channel between two moving surfaces. The channel is formed partly in each surface and produces an opening or chamber of an oval section, there being as many such chambers as there are ropes of dough. The lump of dough is rolled in this channel and thoroughly kneaded and worked. This action forms a skin over the entire surface. The completely skin-covered masses of dough, in flattened spherical forms, are placed upon an endless band or apron and subjected to the action of a flat surface which is depressed upon them. As the flattener rises the apron moves a little way, and at the next depression of the flattener a new lot of balls is presented to be flattened, while the previously flattened ones are pricked with points or "docked." The further motions of the apron carry the now completely-shaped masses of dough forward by successive steps, and deliver them upon the plate of metal carried forward by another band below. When the spheroidal masses of dough are dropped from the kneading-plates they are arranged in proper order upon the endless apron by the action of a toothed or deeply notched surface in a reciprocating plate or pusher, which moves forward at the right time and regulates their position, leaving them in a series extending directly across the apron, and exactly spaced to uniform distances apart.

The following is a description of what I consider the best means of carrying out the invention.

The accompanying drawings form a part of this specification.

Figure 1 is a vertical longitudinal section. Fig. 2 is an end elevation, and Fig. 3 is a side elevation of the machine complete. The additional figures show details removed. Figures 4 and 5 are plan views of the peculiar knives which, moving together and separating again, cut off the ropes of dough. Fig. 6 is a plan view of the notched-plate which pushes forward the masses of dough. Fig. 7 is a top view of the bottom kneader or molding-plate. Fig. 8 is a view from below of the top molding-plate. Fig. 9 is a cross-section of the two molding-plates applied together.

Similar letters of reference indicate like parts in all the figures.

X X is a cast-iron frame, supporting all the parts. A A are rolls properly formed to receive the dough in a mass, and deliver it in elongated masses of uniform circular sections, and which I have designated as skin-covered ropes. These rolls are turned intermittently by means of a pawl and lever acting on the ratchet-wheel B and receiving the motion from a crank-pin on the main shaft, as plainly shown in Fig. 3. The dough after being properly kneaded is introduced between the rolls A A, and being formed into ropes passes down therefrom through spaces between guiding-plates $a$, and is subjected to the action of peculiarly formed reciprocating-knives C C, which are carried respectively by the two molding-plates, E and F. These knives C C are formed with deep notches corresponding approximately to the cylindrical shape of the ropes of dough, and as the knives meet and overlap each other they clip off the rope of dough into short lengths by clean cuts and without materially deforming the strips of dough. In other words, the knives C C are so formed as to act on the dough with a nearly uniform pressure from all sides at once. They consequently cut off the ropes without flattening them.

The masses thus cut off should have a length about equal to their diameter. They fall into the tubes D, each lump falling in a separate tube. Each rests on the upper surface of the upper molding-plate E for a brief period, and then, by the backward motion of the plate E, is allowed to fall through a notch in the front of the plate and rest on one of the grooves or channels $f$ formed in the upper surface of the lower molding-plate F. The upper plate E is reciprocated by rods P, one of which is mounted on each side of the machine, and is operated by crank-pins $p$ fixed in wheels properly placed and driven, as plainly shown in Fig. 3. Gear-wheels R are mounted on fixed studs so as to serve in connecting racks $e$ on the under side of the upper molding-plate E, with corresponding racks $f$ on the upper side of the lower molding-plate F. The molding-plates are guided in grooves on the framing, and are, by the action of the gear-wheels R and the said racks, caused to reciprocate in opposite directions at the same time. The under side of the upper plate E is grooved or chambered, as indicated by $c^1$. The form is plainly shown in Fig. 9. As the upper molding-plate E moves forward the several masses of dough are rolled in the grooves between the upper and lower molding-plates and are thoroughly kneaded. In this rolling action, when the upper plate E has moved forward and the lower plate F has moved backward to a certain extent, the several masses of dough are presented over the several holes G in the lower plate F, and fall through these holes upon the table H. This table is formed with an overhanging plate, $h$, adapted to support the now completely kneaded and skin-covered balls of dough in being pushed forward by the pusher I.

This pusher is connected to the upper plate E and moves therewith. It is notched at its front edge. Each ball of dough is received in a corresponding notch in the pusher I, and as the latter moves forward is pushed along on the plate $h$ and deposited upon the upper apron K, the flattener J being at this period in an elevated position, so that the several balls pass under it. The apron K is moved intermittently by a belt, as shown in Fig. 3. At each revolution of the main shaft O cams thereon act on the rods $j$ and depress the flattener J in opposition to the tension-springs Q. The flattener acts on the recently deposited partially flattened balls of dough to further flatten them. On its rising, the apron K moves forward a little, and on the next descent of the flattener the docking points penetrate it, as will be understood. On rising this time, the clearer L holds the dough to allow the points to be withdrawn. The lower apron M, mounted in the position represented, is worked intermittently by means of a lever and pawl operated by a crank on the main shaft through a ratchet-wheel, as represented. This apron may receive proper plates of sheet metal at the back of the machine and carry them through to receive the crackers thereon as they are delivered from the apron K. The size of the grooves in the molding-plates E and F should correspond carefully to the quantities of dough which they are to treat. The form of the grooves may vary considerably, but the general contour should be nearly as represented. The object is to make the skin-covered masses of dough each of a slightly flattened shape, like an onion, so that they may be pushed and not rolled by the notched plate I to a given location, and there remain.

I claim as my invention—

1. The knives C C, formed as represented, and arranged and operating relative to each other and to the moving ropes of dough as and for the purposes herein specified.

2. The molding-plates E F, chambered or grooved as shown, and operated relatively to each other as shown, so as to receive, roll, and knead masses of dough, and discharge them in the form of skin-covered flattened spheroids, as herein specified.

3. The mechanism represented for communicating oppositely-reciprocating motions to the molding-plates E F—that is to say, the connecting rods P leading from the crank-pins $p$ to one of the molding-plates E, the racks $e$ $f$, and gear-wheels R, combined with the rolls A A and knives C C, and arranged to operate therewith as herein specified.

4. In combination with the mechanism for forming skin-covered lumps of dough, as specified, the notched or tooth-edged pusher plate I reciprocated over the surface on which the masses of dough are dropped, so as to place the dough upon the apron K in determined positions, as herein specified.

5. The reciprocating flattener J, with its attachments operated as specified relatively to the intermittent carrier K, in combination with the mechanism for producing skin-covered spheroids of dough, and for placing them in exactly determined positions under the flattener, as herein specified.

In testimony whereof I have hereunto set my hand this 2d day of May, 1873, in the presence of two subscribing witnesses.

LUCIUS A. ROCKWELL.

Witnesses:
 WM. C. DEY,
 ARNOLD HÖRMANN.